(12) United States Patent
Haack et al.

(10) Patent No.: US 6,557,895 B2
(45) Date of Patent: May 6, 2003

(54) IMPLANT PROTECTIVE PAD FOR USE WITH SEATBELTS

(76) Inventors: Scott G. Haack, 3614 Harris Ave. NW., Canton, OH (US) 44708; Connie L. Haack, 3614 Harris Ave. NW., Canton, OH (US) 44708

(*) Notice: Subject to any disclaimer, the term of this patent is extended or adjusted under 35 U.S.C. 154(b) by 0 days.

(21) Appl. No.: 09/846,001

(22) Filed: Apr. 30, 2001

(65) Prior Publication Data

US 2002/0003346 A1 Jan. 10, 2002

Related U.S. Application Data

(60) Provisional application No. 60/203,604, filed on May 12, 2000.

(51) Int. Cl.[7] ............................................. B60R 21/02
(52) U.S. Cl. ..................... 280/801.1; 280/751; 297/482
(58) Field of Search ............................ 280/801.1, 808, 280/748, 751; 297/482, 487, 488

(56) References Cited

U.S. PATENT DOCUMENTS

| 4,886,318 A | * | 12/1989 | Pennock | ..................... 280/808 |
|---|---|---|---|---|
| 5,322,249 A | * | 6/1994 | You | ........................... 156/156 |
| 5,620,234 A | * | 4/1997 | Gunby | ....................... 297/482 |
| 5,664,843 A | * | 9/1997 | Gleason | ..................... 297/471 |
| 6,273,467 B1 | * | 8/2001 | Berke et al. | ................ 280/751 |

* cited by examiner

Primary Examiner—Paul N. Dickson
Assistant Examiner—Faye M. Fleming
(74) Attorney, Agent, or Firm—Sand & Sebolt (57) ABSTRACT

A protective pad for positioning over a medical device subdermally implanted in the chest of a passenger between the shoulder strap of an automobile seat belt assembly and the chest of the passenger. The pad has a generally continuous lateral wall or a U-shaped lateral wall having an inner end positionable on the passenger's chest and an opposed outer end. There is a top wall superimposed over the outer end of the continuous lateral wall to form a recessed area beneath this top wall over the medical device. A pair of fabric flaps extend from the generally continuous lateral wall in opposed relation to each other. These flaps are each equipped with VELCRO strips to be engageable with each other around the seat belt shoulder strap. Alternatively, a single flap equipped with a VELCRO strip can engage a similar strip on the top wall.

14 Claims, 10 Drawing Sheets

IMPLANT PROTECTIVE PAD FOR USE WITH SEATBELTS

This application claims benefit of provisional application Ser. No. 60/203,604 filed May 12, 2000.

BACKGROUND OF THE INVENTION

1. Technical Field

The present invention relates to medical devices, and more particularly, surgically implanted medical devices. Still more particularly, this invention relates to protective pads to cushion a surgical implant while automotive seat belts are being worn.

2. Background Information

A medical device such as cardiac pacemakers and defibrillators are implanted subdermally in a patient's chest. Access parts may also be positioned in this area. Since these devices are usually positioned at a relatively small distance beneath the patient's skin, a certain degree of discomfort may result when wearing an automotive seat belt. That is, the shoulder strap of the seat belt assembly may bring a certain amount of pressure on the implanted device.

In the event of a collision, the shoulder strap of a seat belt assembly may also exert considerable force on the chest of a passenger in the vicinity of an implant. Such force may present a serious danger to such a passenger.

A need, therefore, exists for a way to improve the comfort of a patient who has received such an implant while that patient is a passenger in an automobile. A need also exists to enhance the safety of a passenger having such an implanted medical device in the event of a collision.

SUMMARY OF THE INVENTION

The object of the present invention is to provide an easy and inexpensive means of cushioning a surgical implant from the shoulder strap of an automotive seat belt assembly.

It is a further object of the present invention to provide a means for lessening the amount of force exerted on the chest of a passenger with an implanted medical device by the shoulder strap in the event of a collision.

These and other objects are met by the present invention which is a protective pad for positioning over a medical device subdermally implanted in the chest of a passenger between the shoulder strap of an automobile seat belt assembly and the chest of the passenger. The pad has a generally continuous lateral wall having an inner end positionable on the passenger's chest and an opposed outer end. There is a top wall superimposed over the outer end of the continuous lateral wall to form a recessed area beneath this top wall over the medical device. A pair of fabric flaps extend from the generally continuous lateral wall in opposed relation to each other. These flaps are each equipped with VELCRO strips to be engageable with each other around the seat belt shoulder strap.

In another embodiment, the pad has a generally U-shaped lateral wall in which the inner end is positionable on the passenger's chest and which extends to an opposed outer edge. A top wall is superimposed over the outer edge of the lateral wall the former recessed area beneath the top wall and over the medical device. A single clasp extends outwardly from the lateral wall. This flap is equipped with a velcro strip, and the flap may be folded inwardly over the seatbelt shoulder strap to engage a similar velcro strip on the top horizontal wall of the pad.

Also encompassed by the present invention is a protective device for positioning between the shoulder strap of an automobile and the chest of a passenger over a medical device subdermally implanted into the chest of the passenger. There is a concave pad comprised of a compressible material positioned adjacent the chest of the passenger such that the recessed area is formed over the medical device. Means are then provided for securing the concave member to the shoulder strap.

BRIEF DESCRIPTION OF THE DRAWINGS

The preferred embodiment of the invention, illustrative of the best mode in which applicant contemplated applying the principles, is set forth in the following description and is shown in the drawings and is particularly and distinctly pointed out and set forth in the appended claims.

DESCRIPTION OF THE PREFERRED EMBODIMENTS

Figure 1:
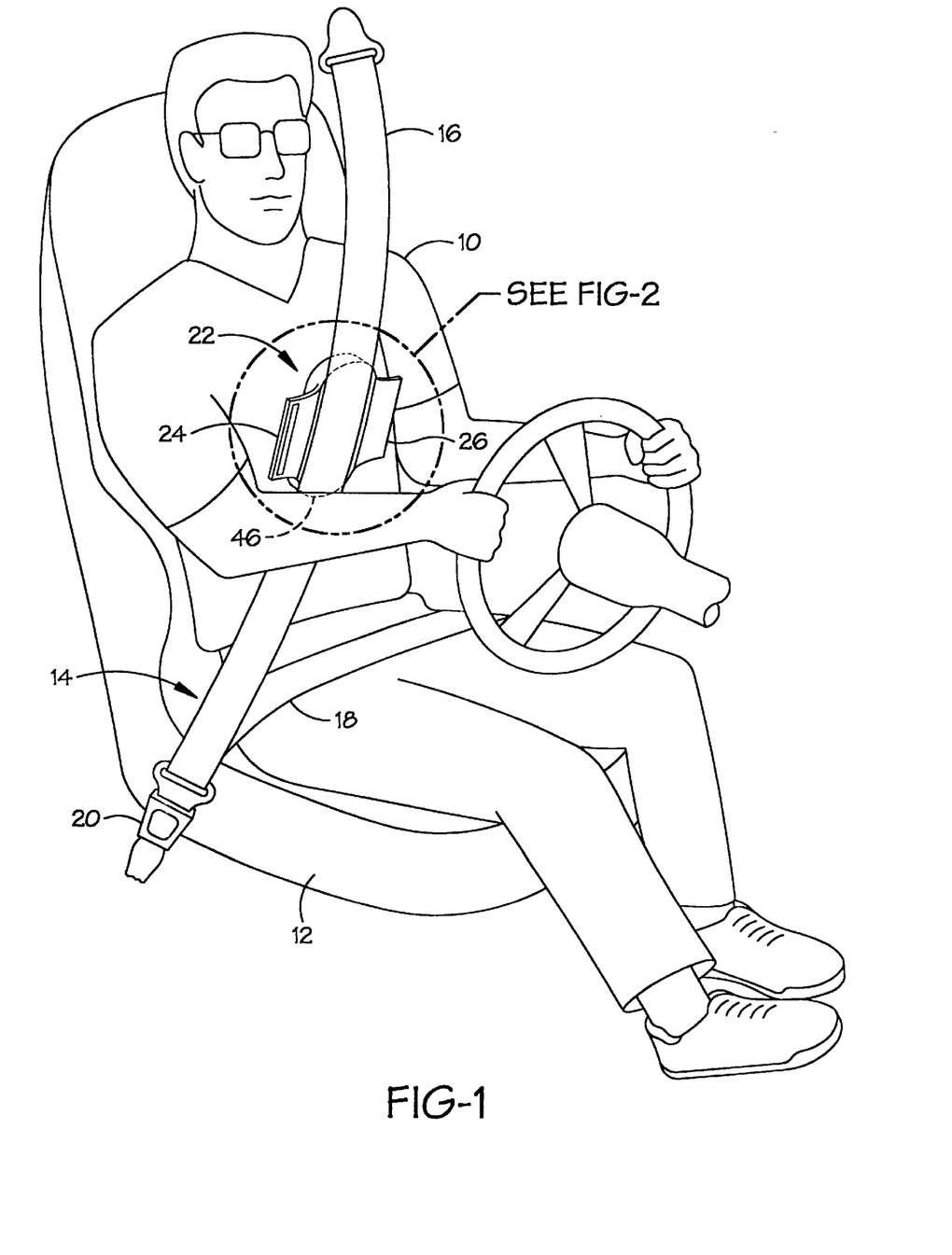
FIG. 1 is a front schematic view of a passenger wearing an automotive seat belt with the aid of a preferred embodiment of the protective pad of the present invention in a position before the flaps of the pad have been engaged with each other over the shoulder strap.

Referring to FIG. 1, a passenger 10 is positioned in an automobile seat 12 which is equipped with a seat belt assembly shown generally at numeral 14. The seat belt assembly includes a shoulder strap 16, a lap strap 18 and a release mechanism 20. The protective pad of this invention is shown generally at numeral 22 and is positioned between the chest of the passenger 10 and the shoulder strap 16 of the seat belt assembly 14. The shoulder strap 16 of the seat belt 14 extends over the central portion of the pad 22 between two opposed seat belt engaging fabric flaps 24 and 26.

Figure 2:
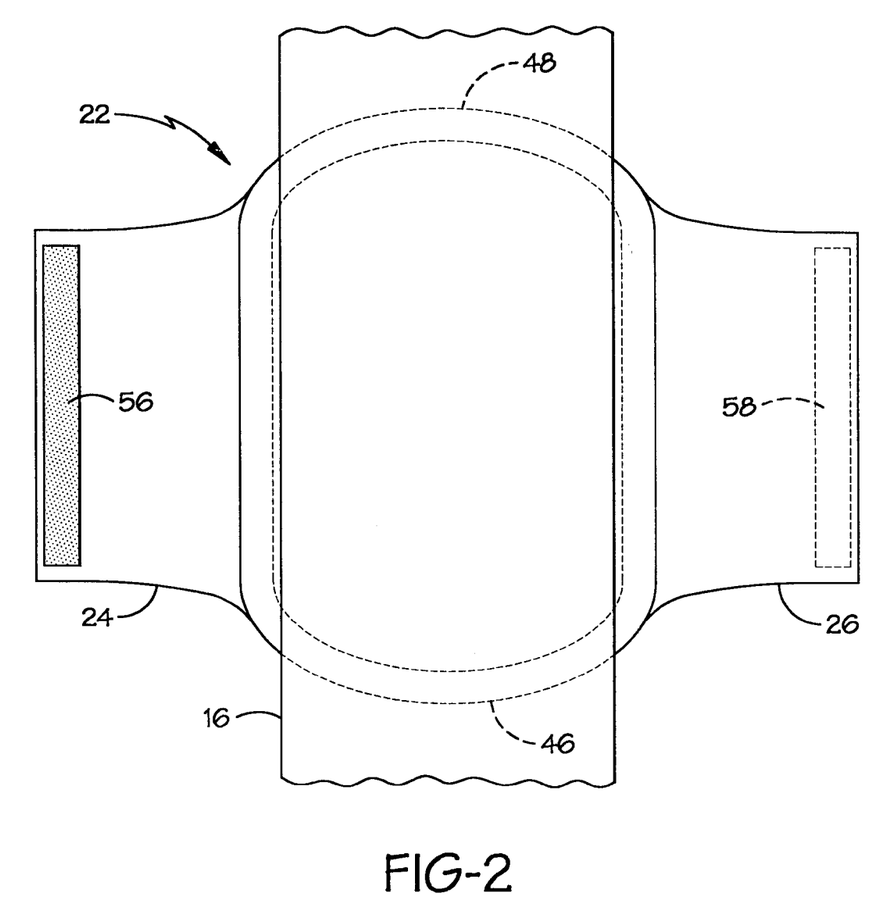
FIG. 2 is a top plan view of the protective pad shown at circle 2 in FIG. 1.
Figure 3:
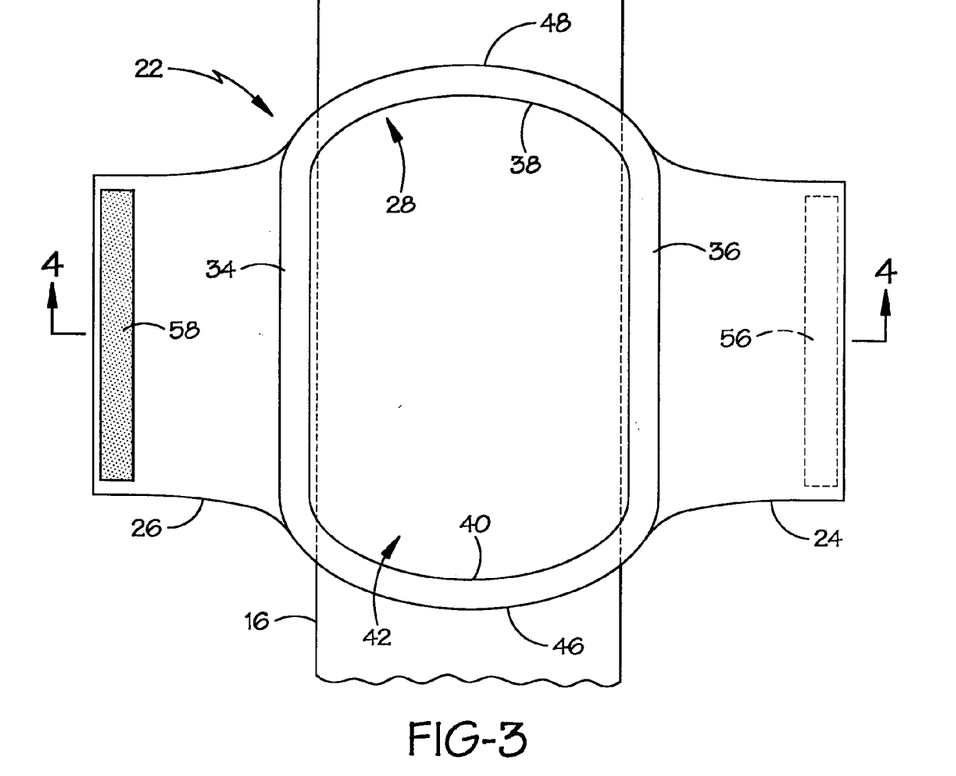
FIG. 3 is a bottom plan view of the protective pad shown in FIG. 2 along with the seat belt shoulder strap.
Figure 4:
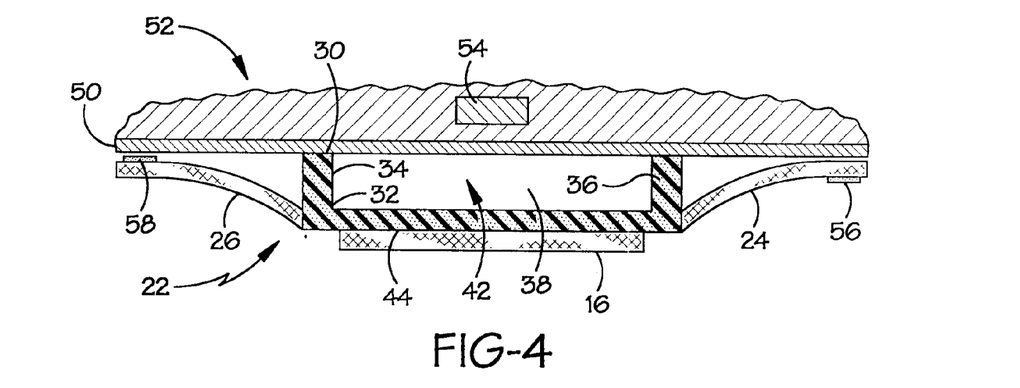
FIG. 4 is a cross sectional view through 4—4 in FIG. 3.

Referring to FIGS. 2–4, the pad 22 is shown in greater detail. The pad 22 includes a continuous vertical lateral wall 28 which has an inner edge 30 and an outer edge 32. Included in the continuous vertical lateral wall are opposed side walls 34 and 36 and opposed end walls 38 and 40.

Inside the continuous vertical lateral wall 28, there is an interior recessed area 42. A top horizontal wall 44 is superimposed over the continuous vertical lateral wall 28 and continued in interior recessed area 42. A top horizontal wall 44 is superimposed over the continuous vertical lateral wall 28 and the interior recessed area. On the top horizontal wall there are opposed lateral curved surfaces 46 and 48 which facilitate the positioning of the shoulder strap 16 in crossing the top horizontal wall 28.

Referring particularly to FIG. 4, it will be seen that the inner end 30 of the continuous vertical lateral wall 28 and the wings 24 and 26 are superimposed on the passenger's clothing 50 which is in turn superimposed on the passenger's chest 52. An implanted cardiac pacemaker, cardiac defibrilator or other medical device 54 is positioned beneath the interior recess area 42 of the protective pad so as to cushion the passenger from movements of the seat belt 16. This device 54 may also schematically represent an access port which, for the purposes of this disclosure, will be considered to be included within the definition of a medical device.

Figure 5:
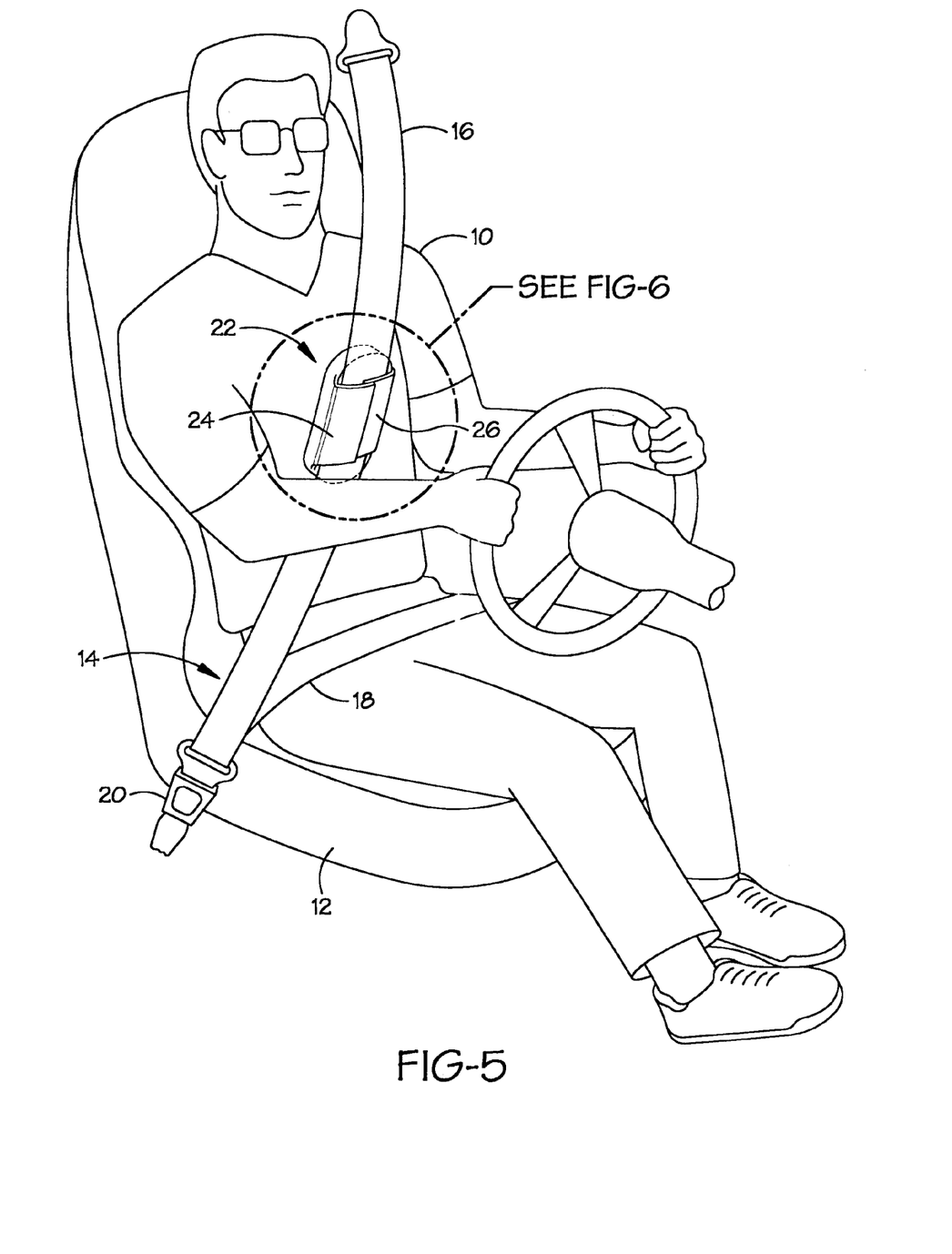
FIG. 5 is a front schematic view similar to FIG. 1 except that the flaps of the pad have been engaged with each other over the shoulder strap.
Figure 6:
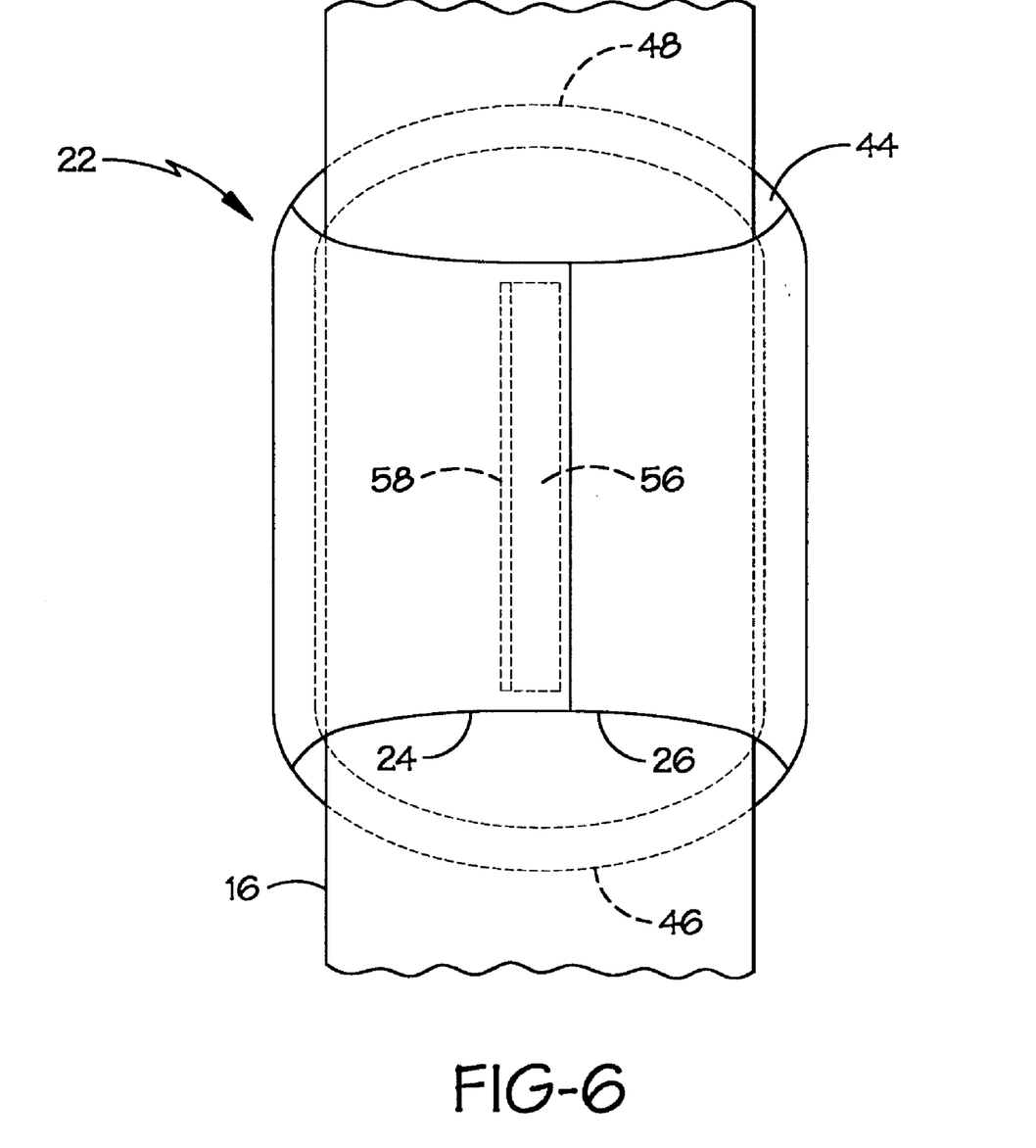
FIG. 6 is an enlarged view of circle 6 in FIG. 5 which is similar to FIG. 2 except that the flaps are engaged with each other over the shoulder strap.
Figure 7:
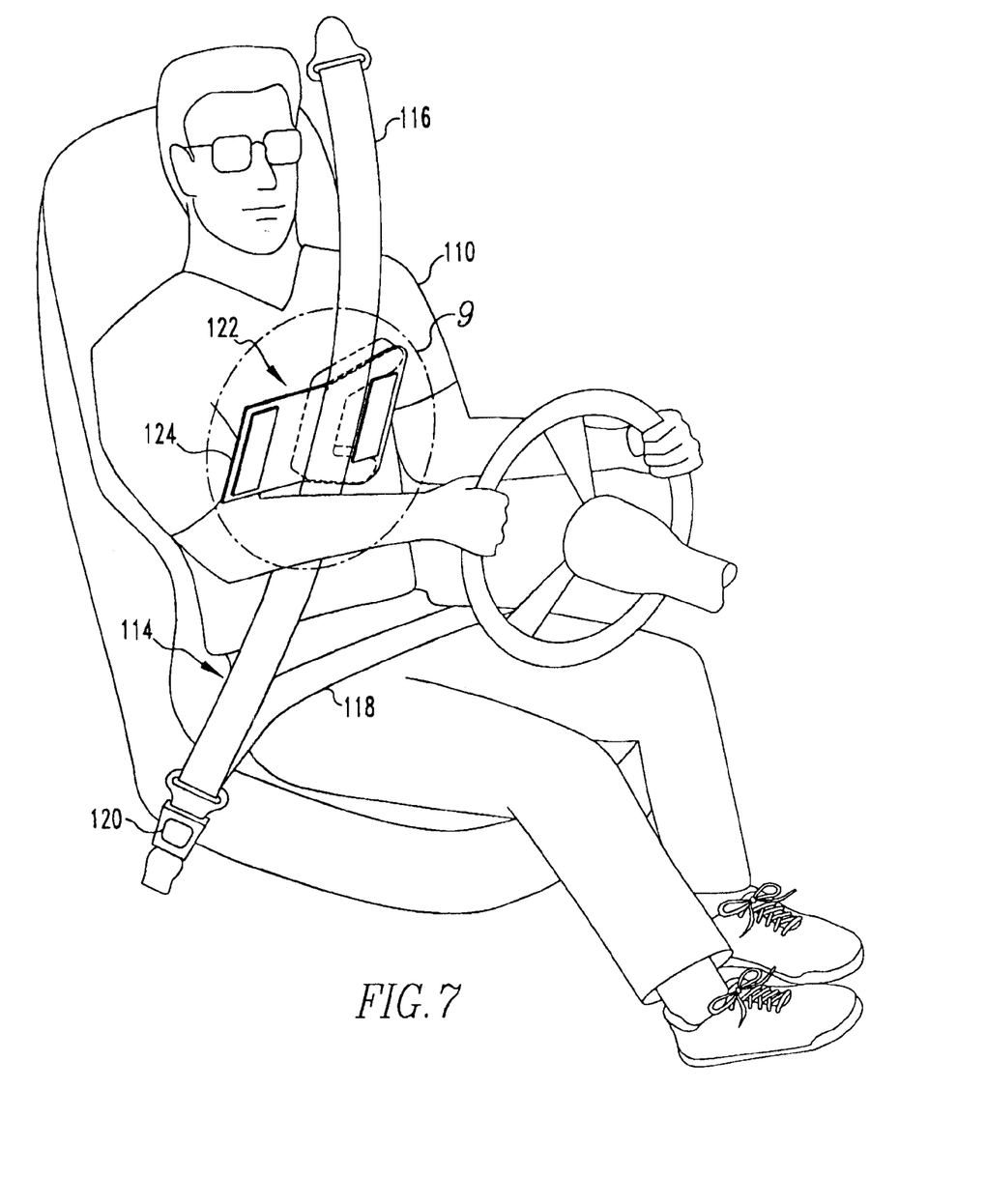
FIG. 7 is a front schematic view of a passenger wearing an automotive seat belt with the aid of a preferred embodiment of the protective pad of the present invention in a position before the flaps of the pad have been engaged with each other over the shoulder strap.
Figure 8:
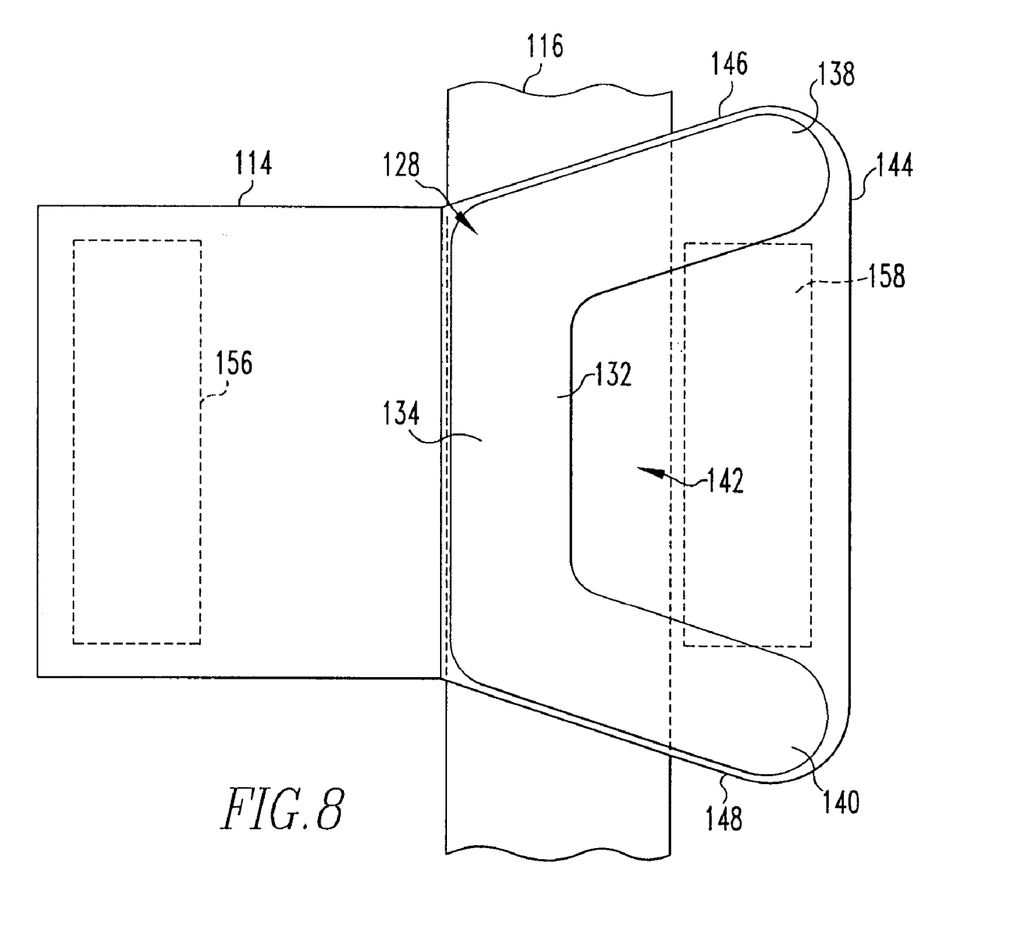
FIG. 8 is a bottom plan view of the protective pad shown in FIG. 7 along with seatbelt shoulder strap.
Figure 9:
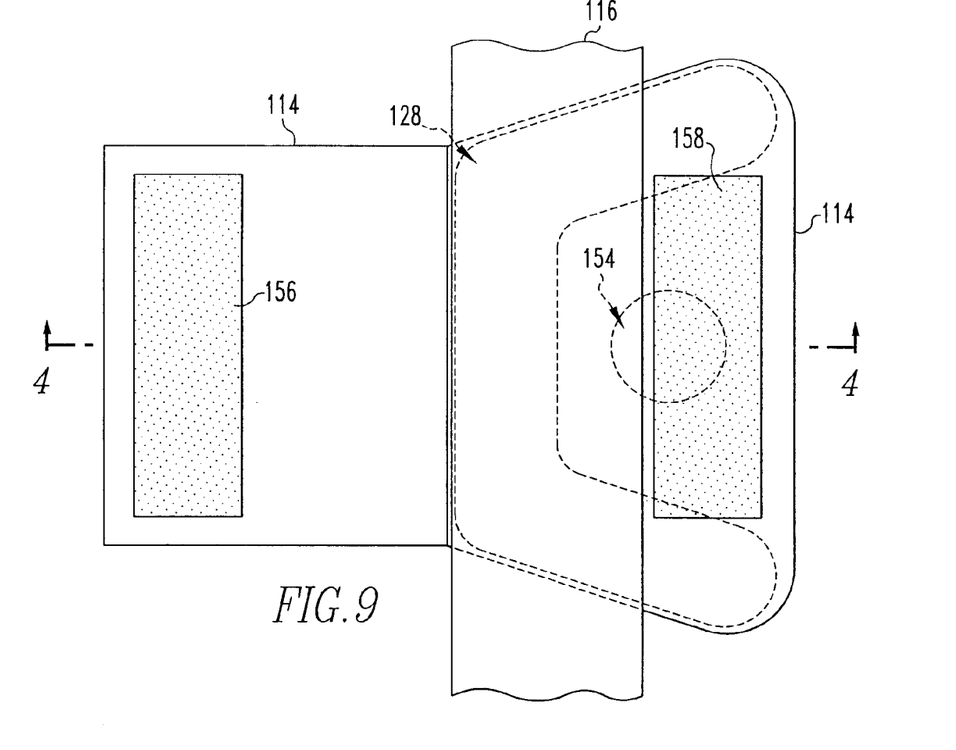
FIG. 9 is a top plan view of the protective pad shown in circle 9 FIG. 7 along with the seat belt shoulder strap.

Referring to FIGS. 2–4, there is a VELCRO strip 56 on the upper surface of fabric flap 24. There is also a VELCRO strip 58 on the lower surface of the fabric flap 26. Referring to FIGS. 5–6, in order to complete the emplacement of pad 22 flap 26 is first overlaid on the top horizontal wall 44 to expose VELCRO strap 58. Flap 24 is then overlaid on flap 26 and VELCRO strap 56 is engaged with VELCRO strap 58 so that the flap 24 and 26 wrap around the shoulder strap 16 and secure the pad 22 to the shoulder strap 16.

The protective pad 22 is preferably rubber, foam polyurethane or some other suitable flexible and impact absorbing polymeric material.

Figure 10:
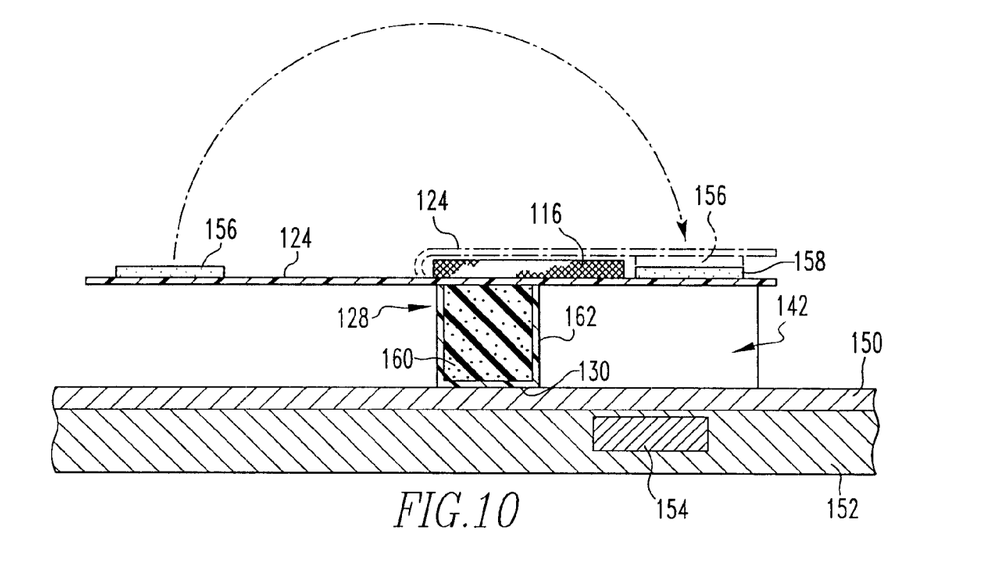
FIG. 10 is a cross sectional view through 4—4 in FIG. 3.

Referring to FIGS. 7–12, in a second embodiment a passenger 110 occupies a seat 112 and makes use of a seatbelt assembly 114. This seatbelt assembly is comprised of a shoulder strap 116 and a lap belt 118 along with a conventional fastener and release mechanism 120. The pad is shown generally at numeral 122. In this embodiment, a single flap 124 extends from the pad 122. The pad comprises a generally U-shaped wall 128 with an inner edge 130 adjacent the chest of a passenger 110. The wall extends outwardly to an outer edge 132. The U-shaped wall 128 is comprised of a longitudinal section 134 from which an oblique transverse upper wall 138 extends at one end and an oblique transverse lower wall 140 extends at the other end. U-shaped wall 128 includes an insert 160 and a covering 162 (FIG. 10). A recess area 142 is formed between the chest of a passenger 110 and the top horizontal wall 144. Ridges 146 and 148 extend outwardly from the top horizontal wall 144.

Referring particularly to FIG. 10, it will be seen that the inner edge 130 of the U-shaped wall 128 and the flap 124 are superimposed on the passenger's clothing 150 which is in turn superimposed on the passenger's chest 152. An implanted pacemaker or defibrilator 154 or other medical device is surgically implanted and positioned beneath the interior recess area 142 of the protective pad so as to cushion the passenger from movement of the seatbelt 116.

Figure 11:
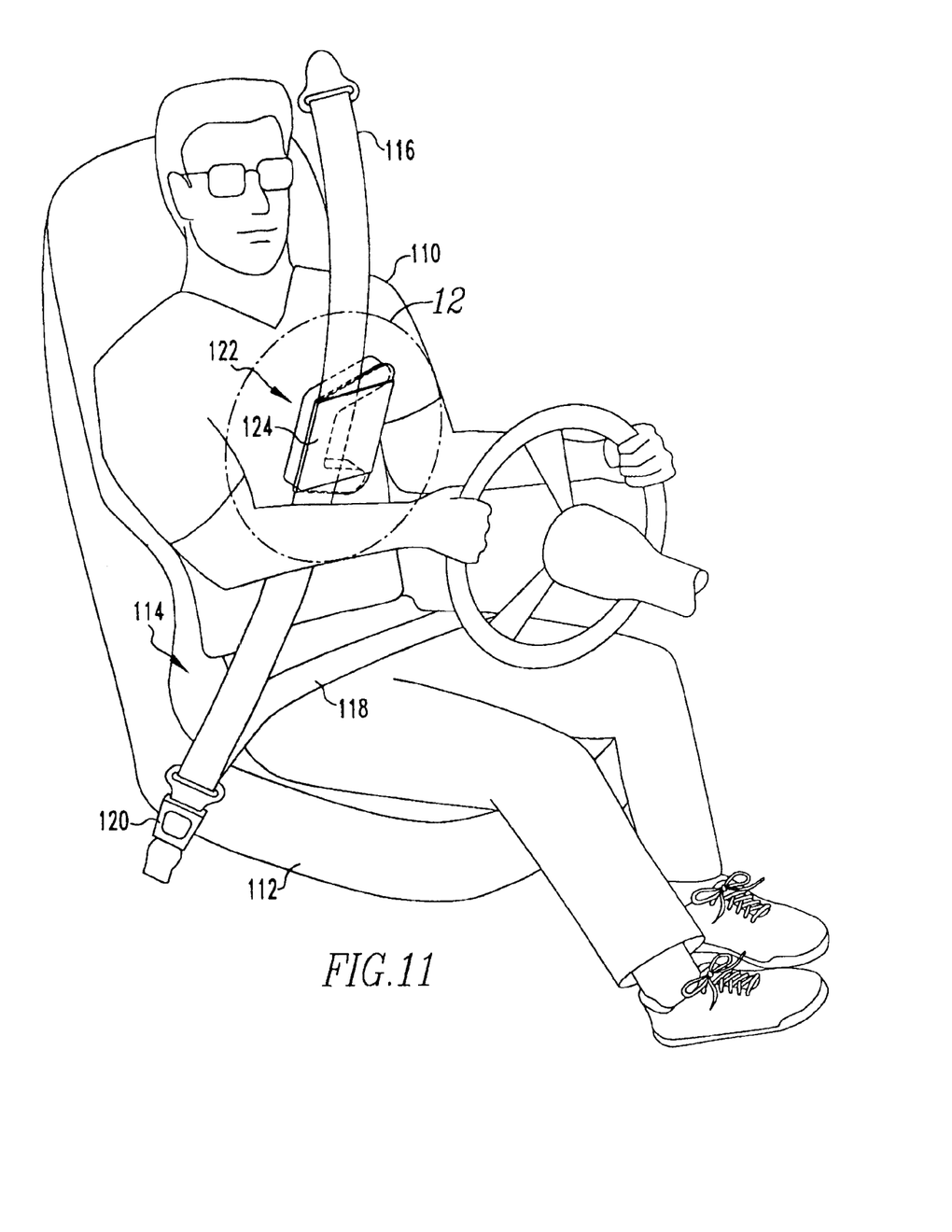
FIG. 11 is a front schematic view similar to FIG. 7 except that the flaps of the pad have been engaged with each other over the shoulder strap.
Figure 12:
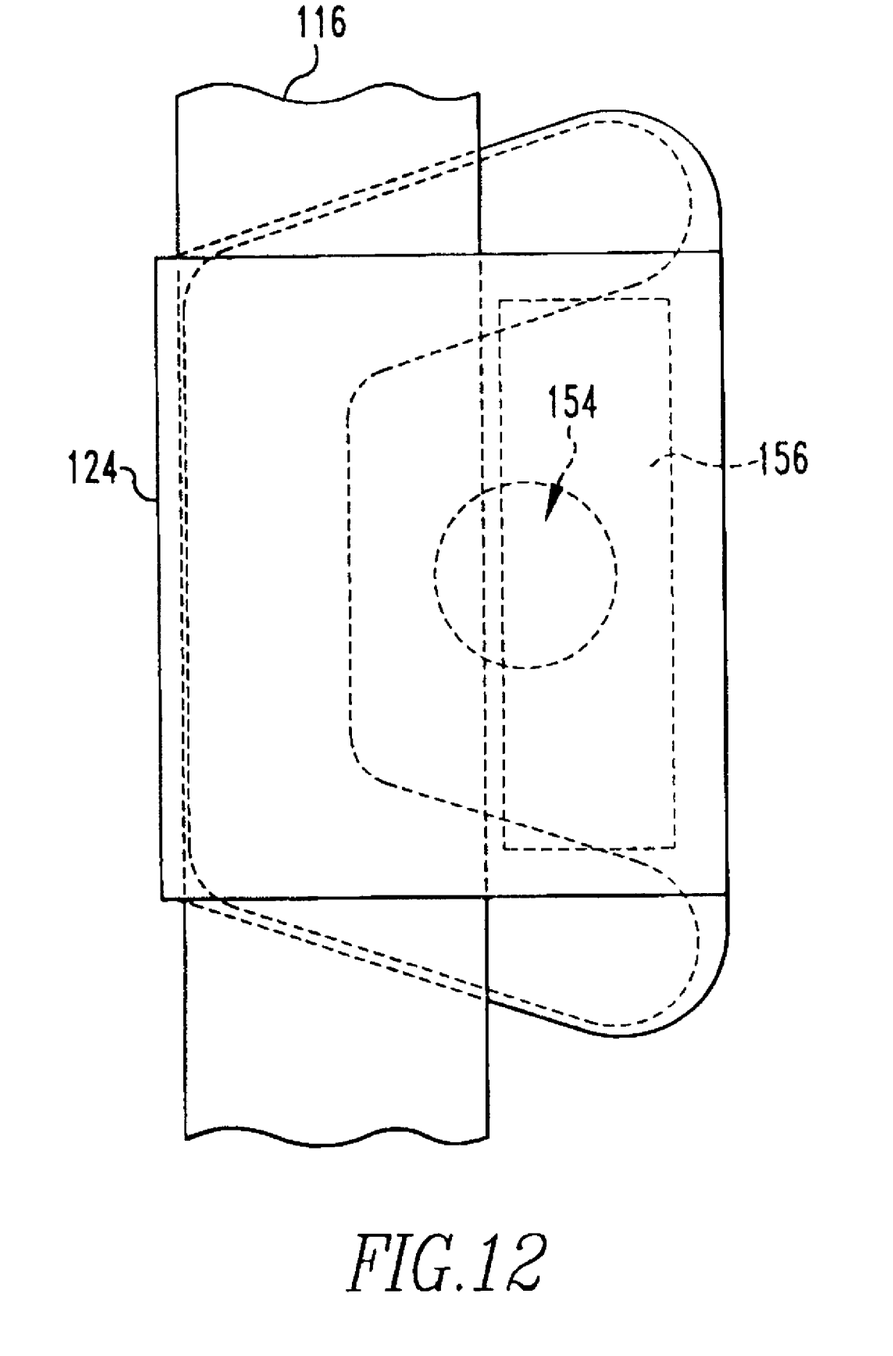
FIG. 12 is an enlarged view of circle 6 in FIG. 11 which is similar to FIG. 2 except that the flaps are engaged with each other over the shoulder strap.

Referring to FIGS. 7–10, there is a VELCRO strip 156 on the upper surface of flap 124 and there is also a VELCRO strip 158 on the upper surface of top horizontal wall 144. Referring to FIGS. 11–12, in order to complete replacement of the pad 122, flap 124 is first overlayed on top horizontal wall 144 so that VELCRO strip 156 is engaged with VELCRO strip 158 so that the flap 124 and top wall 144 surround the shoulder strap 116 and secure the pad 122 to the shoulder strap 116.

The protective pad 122 is preferably rubber, foam polyurethane, or some other suitable flexible and impact absorbing polymeric material.

A test was conducted of the protective pad of the present invention made according to the above described second embodiment wherein the pad was foam polyurethane. For an unprotected occupant, in a 30 mph collision with a stationary object the shoulder belt of a seat belt assembly was measured to exert of force of 233.3 pounds per square inch over the chest area of the occupant where a defibrilator or pacemaker would be located. With the above described second embodiment, the force exerted on the passenger's chest was decreased by about 80 pounds per square inch over the area where a defibrilator or pacemaker would be located.

It will be appreciated that the protective pad of the present invention provides a quick, easy and inexpensive way to cushion a surgically implanted medical device from a shoulder strap of a seat belt assembly for a passenger in an automobile.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A protective pad for positioning between the shoulder strap of an automobile seat belt assembly and the chest of a passenger over a medical device subdermally implanted in the chest of said passenger, said protective pad comprising:
   a substantially C-shaped lateral wall having an outer edge, a body, and lateral legs extending outwardly from the body;
   a top wall superimposed on the outer edge of the C-shaped lateral wall to form a recessed area beneath said top wall and intermediate the lateral legs, the recessed area adapted to be positioned over the medical device;
   the lateral legs having ends defining an opening that allows access to the recessed area; the opening adapted to allow access to the recessed area when the protective pad is positioned against the chest of the passenger; and
   a flap extending from the C-shaped lateral wall and being foldably engageable with the top wall to form a slot adapted to receive the shoulder strap to secure the protective pad between the shoulder strap and the chest of the passenger.

2. The protective pad of claim 1 wherein there is a fastening means for fixing the flap to the top wall.

3. The protective pad of claim 1 wherein the medical device is a cardiac pacemaker.

4. The protective pad of claim 1 wherein the medical device is a cardiac defibrilator.

5. The protective pad of claim 1 wherein the medical device is an access port.

6. The pad of claim 1 wherein the slot overlies the body of the C-shaped lateral wall.

7. A protective pad for positioning between the shoulder strap of an automobile seat belt assembly and the chest of a passenger over a medical device subdermally implanted in the chest of said passenger, said protective pad comprising:
   a substantially U-shaped lateral wall having an inner edge positionable adjacent the chest of the passenger and extending outwardly therefrom to an opposed outer edge; wherein the substantially U-shaped lateral wall is comprised of a medial longitudinal wall and a pair of generally spaced transverse walls extending from the medial longitudinal wall;

a top wall superimposed on the outer edge of the U-shaped lateral wall to form a recessed area beneath said top wall over the medical device; and a flap extending outwardly from the generally U-shaped lateral wall and being foldable inwardly and engageable with the top wall around the shoulder strap to secure the protective pad between the shoulder strap and the chest of the passenger.

8. The protective pad of claim 7 wherein the substantially U-shaped lateral wall is comprised of flexible material.

9. The protective pad of claim 7 wherein the generally spaced transverse walls extend obliquely from the medial longitudinal wall.

10. The protective pad of claim 7 wherein the substantially U-shaped lateral wall is comprised of compressible material.

11. The protective pad of claim 10 wherein the substantially U-shaped lateral wall is comprised of an impact absorbing material.

12. The protective pad of claim 11 wherein impact absorbing material is selected from the group consisting of rubber and a foam polymeric material.

13. The protective pad of claim 10 wherein the top wall is comprised of the same material as the substantially U-shaped lateral wall which comprises a compressible material.

14. The protective pad of claim 12 wherein the foam polymeric material is foam polyurethane.

* * * * *